United States Patent
Stumpf et al.

[11] Patent Number: 5,990,461
[45] Date of Patent: Nov. 23, 1999

[54] PHOTOTHERMOGRAPHIC MEDIA PROCESSOR THERMAL CONTROL

[75] Inventors: Paul B. Stumpf, Rochester; Alan T. Brewen, Pittsford, both of N.Y.

[73] Assignee: Eastman Kodak Company, Rochester, N.Y.

[21] Appl. No.: 08/979,646

[22] Filed: Nov. 26, 1997

[51] Int. Cl.⁶ .................................................. H05B 1/02
[52] U.S. Cl. ........................ 219/497; 219/505; 219/216; 255/405
[58] Field of Search .................................... 219/497, 216, 219/505, 494, 508, 483; 355/285, 290, 208, 405

[56] References Cited

U.S. PATENT DOCUMENTS

| | | | |
|---|---|---|---|
| 4,006,985 | 2/1977 | Hutner | 355/14 |
| 4,304,985 | 12/1981 | Miller . | |
| 4,822,977 | 4/1989 | Leising et al. | 219/216 |
| 5,266,774 | 11/1993 | Kimiura et al. | 219/216 |
| 5,561,512 | 10/1996 | Fukano et al. | 355/285 |
| 5,568,229 | 10/1996 | Sszlucha | 355/208 |

FOREIGN PATENT DOCUMENTS

95/30934  11/1995  WIPO .

*Primary Examiner*—Mark Paschall
*Attorney, Agent, or Firm*—William F. Noval

[57] ABSTRACT

A thermal processor for thermally processing a sequence of exposed photothermographic media comprising: a rotatable thermally conductive drum; a heat source for heating the drum to a setpoint temperature; a plurality of rollers spaced around a portion of the periphery of the drum for holding down exposed photothermographic media to the drum for thermal development thereof; a sensor for sensing the temperature of the drum; and a control for controlling the temperature of the drum as a function (1) of the setpoint temperature, (2) of the sensed drum temperature, and (3) of the status of the processor, i.e., whether or not photothermographic media is being processed by the drum, in order to compensate for heat loss due to media heating and roller heating.

3 Claims, 2 Drawing Sheets

5,990,461

PHOTOTHERMOGRAPHIC MEDIA PROCESSOR THERMAL CONTROL

FIELD OF THE INVENTION

This invention relates in general to processors for photothermographic media and relates more particularly to the closed loop thermal control of a heated drum photothermographic processor to achieve consistency of heating media intrasheet and intersheet.

BACKGROUND OF THE INVENTION

Exposed photothermographic media (film, paper) is developed by a thermal processor. A typical thermal processor includes a heated drum to which the media is held by means of a belt or rollers, such as disclosed in U.S. Pat. No. 4,304,985, issued Dec. 8, 1981, inventor Miller; and PCT unexamined International Application WO 95/30934, published Nov. 16, 1995, inventors Star et al. In the latter application, the hold down rollers are of hollow or solid metallic material that are thermally conductive, as a result of exposed film in passing over the drum surface has a tendency to sink heat from the rollers at an accelerated rate for the first several films in a burst. The consequence of this is that the roller temperatures drop, thereby giving less heat energy to the film until an equilibrium is reached. This results in a density shift from film to film during burst. The temperatures of the pressure rollers drift depending on the time sequence of sheets being processed. The amount of drift is bounded by a maximum equal to the drum temperature setpoint, T0 and a minimum equal to the temperature at which zero roller-to-film heat transfer occurs (lowest for the first roller and increasing for succeeding rollers). As roller temperatures drift, corresponding variations in roller-to-film heat transfer occurs. If a simple thermal control servo is used to hold the drum temperature perfectly constant at some fixed sensor location, then these variations in roller-to-film heat transfer will cause corresponding variations in the time-temperature profile of the emulsion. The end result of all this is decreasing sheet-to-sheet density (a repeatability problem)—even though the drum temperature is held perfectly constant at the sensor location. It has been found that the density can decrease by as much as 10–15% for successive processing of ten or more sheets.

There exists a need therefore for a thermal control process that compensates for roller temperature variations.

SUMMARY OF THE INVENTION

According to the present invention, there is provided a solution to the problems discussed above.

According to a feature of the present invention, there is provided a thermal processor for thermally processing a sequence of exposed photothermographic media comprising: a rotatable thermally conductive drum; a heat source for heating the drum to a setpoint temperature; a plurality of rollers spaced around a portion of the periphery of the drum for holding down exposed photothermographic media to the drum for thermal development thereof; a sensor for sensing the temperature of the drum; and a control for controlling the temperature of the drum as a function (1) of the setpoint temperature, (2) of the sensed drum temperature, and (3) of the status of the processor, i.e., whether or not photothermographic media is being processed by the drum, in order to compensate for heat loss due to media heating and roller heating.

ADVANTAGEOUS EFFECT OF THE INVENTION

The invention has the following advantages.

1. A heated drum thermal processor consistently heats photothermographic film both intrasheet and intersheet.

2. Control of drum temperature varies with processing conditions, i.e., whether film is being processed or not, resulting in more accurate and efficient thermal control.

DETAILED DESCRIPTION OF THE INVENTION

Figure 1:
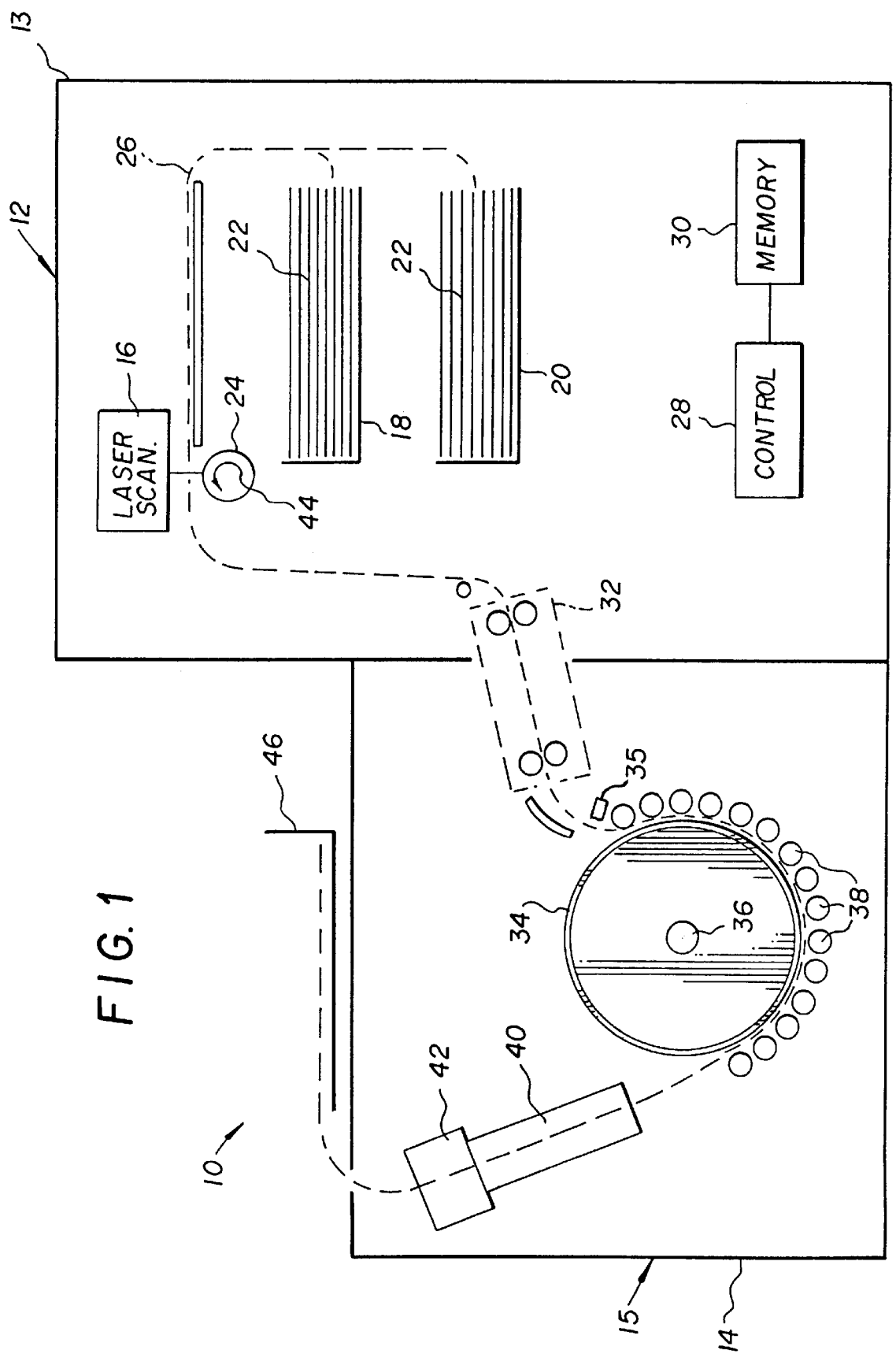
FIG. 1 is a diagrammatic view of a laser printer and processor incorporating the present invention.

Referring now to FIG. 1, there is shown laser imaging apparatus incorporating the present invention. As shown, apparatus 10 includes a laser printer 12 and processor 14. Although printer 12 and processor 14 are shown as housed in separate units, it will be understood that they could be integrated into one housing. In the specific application described here, printer 12 is a medical image laser printer for printing medical images on photothermographic film which is thermally processed by thermal processor 14. The medical images printed by printer 12 can be derived from medical image sources, such as medical image diagnostic scanners (MRI, CT, US, PET), direct digital radiography, computed radiography, digitized medical image media (film, paper), and archived medical images.

Printer 12 includes printer housing 13, laser scanner 16, supplies 18,20 for unexposed photothermographic film 22, a slow scan drum 24, film path 26, control 28, memory 30, printer/processor film interface 32. Processor 14 includes processor housing 15, interface 32, drum 34 heated by lamp 36, hold-down rollers 38 located around a segment of the periphery of drum 34, exposed film cooling assembly 40, densitometer 42, and output tray 46. A sensor 35 senses when film 22 has entered the nip between drum 34 and the first roller 38.

Apparatus 10 operates in general as follows. A medical image stored in memory 30 modulates the laser beam produced by the laser of scanner 16. The modulated laser beam is repetitively scanned in a fast or line scan direction to expose photothermographic film 22. Film 22 is moved in a slow or page scan direction by slow scan drum 24 which rotates in the direction of arrow 44. Unexposed photothermographic film 22, located in supplies 18,20, is moved along film path 26 to slow scan drum 24. A medical image is raster scanned onto film 22 through the cooperative operation of scanner 16 and drum 24.

After film 22 has been exposed, it is transported along path 26 to processor 14 by printer/processor film interface 32. The exposed film 22 is developed by passing it over heated drum 34 to which it is held by rollers 38. After development, the film 22 is cooled in film cooling assembly 40. Densitometer 42 reads the density of control patches at the front edge of film 22 to maintain calibration of the laser imaging apparatus 10 and/or to maintain calibration of the drum temperature setpoint. The cooled film 22 is output to tray 46 where it can be removed by a user.

Figure 2:
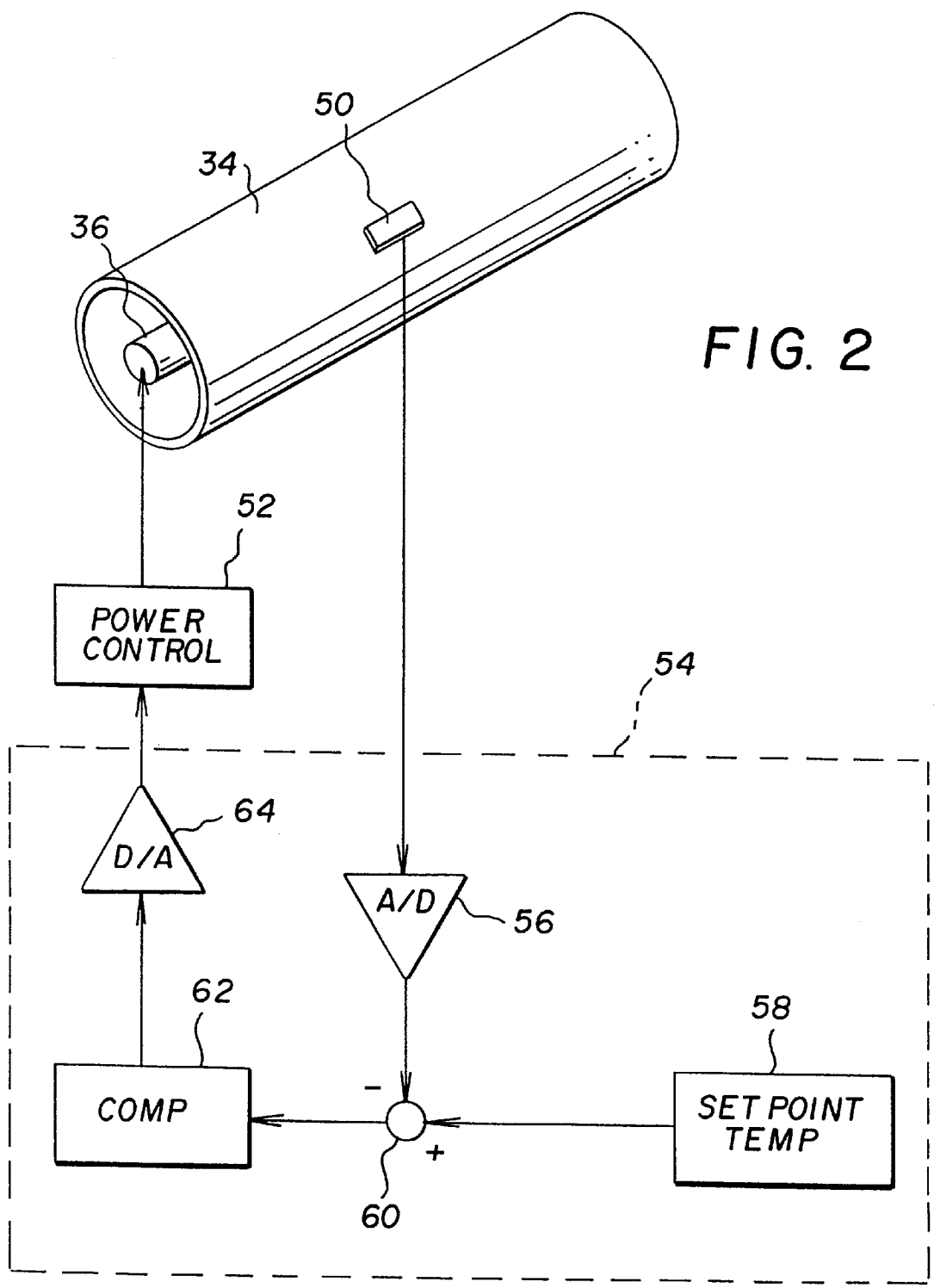
FIG. 2 is a partially schematic, partially diagrammatic view of the thermal processor incorporating the present invention.

As shown in FIG. 2, drum 34 (aluminum cylinder coated with thermally conductive elastomer, such as silicone rubber) is heated internally by radiant heat lamp 36. A thermal sensor 50 (e.g., infrared sensor) senses the temperature of drum 34. Lamp 36 is supplied power by power control 52. A microcontroller circuit 54 controls the temperature of drum 34. Microcontroller circuit 54 can be part of or independent of control 28. The cylinder walls of drum 34 are thick to guarantee uniformity of temperature over its surface. This thickness also represents increased thermal mass and therefore increased thermal inertia. The large thermal inertia creates a difficulty for a thermal control system to quickly recover from large disturbances to the temperature of the drum surface. This is a direct result of the time lag from introduction of the disturbance to the resultant temperature change at the feedback device.

Circuit 54 receives a temperature signal from sensor 50 which s converted to a digital signal by analog-to-digital converter (A/D) 56. A setpoint temperature source 58 provides a setpoint digital signal to comparator 60 which compares it to the sensed signal to produce a control signal to compensation network 62. The compensation network 62 will perform the temperature control algorithm to produce a digital signal converted by digital-to-analog converter 64 to an analog signal which controls power control 52. Control 52 controls lamp 36 to control the temperature of drum 34.

The control circuit operates as follows.

Standby Mode

This mode is intended as an energy saving feature and will be requested by the printer. The setpoint temperature during standby mode will be set. Steady state error shall not be a concern during this time.

Normal Mode

When the drum 34 is at the requested processing setpoint temperature and film 22 is ready to be transported, the PID coefficients shall be optimized to minimize steady state temperature error. A variable setpoint algorithm will compensate for heat depletion of the nip rollers 38. Both amplitude and timing of the variable setpoint will be dependent on the state of the film.

Equations $$T_\delta = T_{sp} - T_d = \text{differential temperature input to PID algorithm}$$

$T_{SP}$=setpoint temperature
$T_d$=drum surface temperature
PID Algorithm:

$$Y_{pid} = K_p * T_\delta(n) + K_I * \Sigma E + K_D * (T_\delta(n) - T_\delta(n-1))$$

where:
$K_p$=proportionate term coefficient
$K_I$=integral term coefficient
$\Sigma E$=sum of errors=$T_\delta(n) + T_\delta(n-1) + T_\delta(n-2) + \ldots$
$K_D$=differential term coefficient Variable Setpoint Control One way to compensate for changing roller temperature, is to appropriately vary the drum temperature setpoint. Since the drum temperature can be servo controlled to follow a varying target temperature, one way to compensate for roller temperature drift is to make the drum target temperature a function of the processing scenario. Generally, during processing the drum temperature and therefore target temperature should be asymptotically increasing toward some appropriate maximum. Likewise, during nonprocessing, the target temperature should be asymptotically decreasing toward some appropriate minimum.

$$T_{spo} = T_{sp} + T_{shift}$$

$T_{shift}(t)$=shift in target temperature above minimum
$T_{spo}$=offset temperature setpoint and where the shift in target temperature, Tshift(t), is varied stepwise in time depending on the throughput scenario.

Simple Approach

In the simplest algorithm the stepwise change in shift temperature can be defined by three parameters:

dt=time step increment
$T_{max}$=maximum shift in target temperature
$\tau$=nominal time constant for roller temperature decay As time increases from anytime, t, to the next time step, t+dt, the target temperature shift changes as follows:

$$T_{shift}(t+dt) = T_{shift}(t) e^{-dt/\tau}$$

if not processing at time, t
(i.e. no film in first nip)

$$T_{shift}(t+dt) = (T_{max} - T_{shift}(t)) e^{-dt/\tau}$$

if processing at time, t
(i.e. film in first nip)

This, in effect, causes the shift to exponentially decay toward zero when there is no film in the first pressure roller nip, and to exponentially approach the maximum shift when film is present in the first nip. Both exponential decay and rise occur at the same prescribed time constant.

General Approach

To provide more flexibility and therefore greater potential for optimization, the algorithm can be made more general to allow for a multitude of temperature shifts, each associated with a different time constant. And, since the roller heating (by the drum) is somewhat different than roller cooling (by the film), it may be beneficial to allow for different time constants for heating and cooling. Also, it may be advantageous to allow for different switching points, that lead or lag relative to the first nip. Given all this, the following general algorithm is suggested:

dt=lime step increment at which the temperature shift is updated
I=number of component temperature shifts
$T_{shift}(t)$=shift in target temperature $$= \sum_{i=1}^{I} T_{shift\,i}(t)$$

Each component shift, $T_{shift\,i}(t)$, is defined by a set of four parameters:

$\{T_{max\,i}, \tau_{heat\,i}, \tau_{cool\,i}, t_{lag\,i}\}$
where for the i-th component $T_{max\,i}$=maximum shift in target temperature
$\tau_{heat\,i}$=time constant at which shift is added
$\tau_{cool\,i}$=time constant at which shift is removed
$t_{lag\,i}$=time lag relative to the first roller nip such that $$T_{shift\,i}(t+t_{lag\,i}+dt) = T_{shift\,i}(t+t_{lag\,i}) \exp(-dt/\tau_{cool\,i})$$

if no film in first nip at time, t $$T_{shift\,i}(t+t_{lag\,i}+dt) = T_{max\,i} - (T_{max\,i} - T_{shift\,i}(t+t_{lag\,i})) \exp(-dt/\tau_{heat\,i})$$

if film in first nip at time, t

Nominal Representative Case
  T0=121° C.
  I=2
  $\{T_{max\ 1}, \tau_{heat\ 1}, \tau_{cool\ 1}, t_{lag\ 1}\} = \{4°\ C., 120\ sec, 120\ sec, 0\ sec\}$
  $\{T_{max\ 2}, \tau_{heat\ 2}, \tau_{cool\ 2}, t_{lag\ 2}\} = \{2°\ C., 20\ sec, 20\ sec, 0\ sec\}$ The invention has been described in detail with particular reference to certain preferred embodiments thereof, but it will be understood that variations and modifications can be effected within the spirit and scope of the invention.

| | |
|---|---|
| 10 | apparatus |
| 12 | laser printer |
| 13 | printer housing |
| 14 | processor |
| 15 | processor housing |
| 16 | laser scanner |
| 18,20 | supplies |
| 22 | unexposed photothermographic film |
| 24 | slow scan drum |
| 26 | film path |
| 28 | control |
| 30 | memory |
| 32 | printer/processor film interface |
| 34 | drum |
| 36 | radiant heat lamp |
| 38 | hold-down rollers |
| 40 | exposed film cooling assembly |
| 42 | densitometer |
| 44 | output tray |
| 46 | tray |
| 50 | thermal sensor |
| 52 | power control |
| 54 | microcontroller circuit |
| 56 | analog-to-digital converter |
| 58 | temperature source |
| 60 | comparator |
| 62 | compensation network |
| 64 | digital-to-analog converter |

What is claimed is:

1. A thermal processor for thermally processing a sequence of exposed photothermographic media comprising:
   a rotatable thermally conductive drum;
   a heat source for heating said drum to a setpoint temperature;
   a plurality of rollers spaced around a portion of the periphery of said drum for holding down exposed photothermographic media to said drum for thermal development thereof;
   a temperature sensor for sensing the temperature of said drum; and
   a media sensor for sensing the presence or absence of media entering the nip between said drum and said first of said plurality of rollers;
   a closed loop control for controlling said heat source to heat said drum in a first made, when said media sensor senses the presence of media to increase said drum temperature to a first setpoint temperature higher than said temperature of said drum sensed by said temperature sensor and in a second mode, when said media sensor senses the absence of media to decrease drum temperature to a second setpoint temperature lower than said temperature of said drum sensed by said temperature sensor.

2. The thermal processor of claim 1 wherein said control includes a heat source control which controls the heat source as a function of the following control algorithm $$T_{shift}(t+dt) = T_{shift}(t) e^{-dt/\tau}$$

if not processing at time, t
(i.e., no media in first drum/roller nip)
or $$T_{shift}(t+dt) = (T_{max} - T_{shift}(t)) e^{-dt/\tau}$$

if processing at time, t
(i.e., media in first drum/roller nip)
where
  dt=time step increment
  $T_{max}$=maximum shift in target temperature
  $\tau$=nominal time constant for roller temperature decay
and $$T_{spo} = T_{sp} + T_{shift}$$

where
  $T_{spo}$=temperature setpoint offset
  $T_{sp}$=temperature setpoint
  $T_{shift}$=shift in target temperature.

3. The thermal processor of claim 1 wherein said control includes a heat source control which controls said heat source as a function of the following control algorithm $$T_{shift\ i}(t+t_{lag\ i}+dt) = T_{shift\ i}(t+t_{lag\ i}) \exp(-dt/\tau_{cool\ i})$$

if no media in first nip at time, t
or $$T_{shift\ i}(t+t_{lag\ i}+dt) = T_{max\ i} - (T_{max\ i} - T_{shift\ i}(t+t_{lag\ i})) \exp(-dt/\tau_{heat\ i})$$

if media in first nip at time, t
where
  $T_{max\ i}$=maximum shift in target temperature
  $\tau_{heat\ i}$=time constant at which shift is added
  $\tau_{cool\ i}$=time constant at which shift is removed
  $t_{lag\ i}$=time lag relative to the first roller nip.

* * * * *